United States Patent
Oden et al.

(10) Patent No.: US 9,810,083 B2
(45) Date of Patent: Nov. 7, 2017

(54) SYSTEM AND METHOD FOR REMOVING STATOR VANES FROM A CASING OF A ROTARY MACHINE

(71) Applicant: General Electric Company, Schenectady, NY (US)

(72) Inventors: Joshua Michael Oden, Greenville, SC (US); James Bradford Holmes, Fountain Inn, SC (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/413,787

(22) Filed: Jan. 24, 2017

(65) Prior Publication Data

US 2017/0130597 A1 May 11, 2017

Related U.S. Application Data

(62) Division of application No. 14/558,949, filed on Dec. 3, 2014, now Pat. No. 9,587,498.

(51) Int. Cl.
*F01D 9/04* (2006.01)
*B23P 19/04* (2006.01)

(52) U.S. Cl.
CPC .............. *F01D 9/042* (2013.01); *B23P 19/04* (2013.01); *F05D 2230/70* (2013.01)

(58) Field of Classification Search
CPC .......... F01D 9/02; F01D 25/285; F01D 9/042; B25B 27/00; F05D 2230/70; F10D 9/042; Y10T 29/49318; Y10T 29/49721; Y10T 29/4973; Y10T 29/49815; Y10T 29/53; B23P 19/00; B23P 19/04
See application file for complete search history.

(56) References Cited

U.S. PATENT DOCUMENTS

| | | | |
|---|---|---|---|
| 2,547,789 A | 4/1951 | Skeel | |
| 3,350,755 A | 11/1967 | Hanner | |
| 4,078,290 A | 3/1978 | Fletcher et al. | |
| 4,096,614 A | 6/1978 | Brungard et al. | |
| 7,543,415 B2 | 6/2009 | Svendsen | |
| 8,157,620 B2 | 4/2012 | Corn et al. | |
| 8,381,379 B2 | 2/2013 | Holmes et al. | |
| 2005/0074335 A1 | 4/2005 | Bachofner et al. | |
| 2010/0071183 A1 | 3/2010 | McCarvill | |
| 2012/0233837 A1 | 9/2012 | Bartlam et al. | |
| 2013/0206737 A1 | 8/2013 | Holmes et al. | |
| 2013/0322973 A1* | 12/2013 | Holmes ................ | B23B 49/006 408/1 R |

FOREIGN PATENT DOCUMENTS

WO 9633048 A1 10/1996

* cited by examiner

*Primary Examiner* — Jun Yoo
(74) *Attorney, Agent, or Firm* — Armstrong Teasdale LLP

(57) ABSTRACT

A stator vane removal system includes a reaction platform configured to couple between opposing sides of a slot defined in an inner surface of a casing of a rotary machine. At least one stator vane is retained in the slot. The reaction platform includes at least one wedge surface. The system also includes an actuator configured to couple to the reaction platform. The at least one wedge surface facilitates inducing a coupling force exerted by the reaction platform to the opposing sides of the slot when the actuator applies a pushing force to the at least one stator vane in the slot.

20 Claims, 9 Drawing Sheets

SYSTEM AND METHOD FOR REMOVING STATOR VANES FROM A CASING OF A ROTARY MACHINE

CROSS REFERENCE TO RELATED APPLICATIONS

This application is a divisional application and claims priority to U.S. patent application Ser. No. 14/558,949, filed Dec. 3, 2014, for "SYSTEM AND METHOD FOR REMOVING STATOR VANES FROM A CASING OF A ROTARY MACHINE," which is hereby incorporated by reference in its entirety.

BACKGROUND

The field of the disclosure relates generally to rotary machines, and more particularly to a system and method for removing stator vanes from a casing of a rotary machine.

At least some known rotary machines, such as gas turbines, include stages of rotor blades and cooperating stator vanes. At least some such known rotary machines are housed within a casing that is generally shaped like a horizontal tube, formed by an upper section and a lower section. In at least some such known rotary machines, the stator vanes are coupled to slots in an interior side of the casing and extend radially inward into a gas flow path. At least some such known stator vanes have a finite operational lifetime and eventually need maintenance or replacement. To replace at least some such known stator vanes, the upper and lower halves of the casing are uncoupled, and the stator vanes are slid along the slots to an edge of the casing for removal. However, after an operational lifetime of exposure of the stator vanes to conditions within the rotary machine, a significant amount of force may be required to uncouple at least some known stator vanes from their position in the slots and to slide them along the slots to the edge of the casing section. Because of, for example, a size and a concave shape of the casing sections, it is difficult to safely apply a mechanical force required to move at least some known stator vanes along the slots, particularly without damaging the slots and/or casing.

BRIEF DESCRIPTION

In one aspect, a stator vane removal system is provided. The system includes a reaction platform configured to couple between opposing sides of a slot defined in an inner surface of a casing of a rotary machine. At least one stator vane is retained in the slot. The reaction platform includes at least one wedge surface. The system also includes an actuator configured to couple to the reaction platform. The at least one wedge surface facilitates inducing a coupling force exerted by the reaction platform to the opposing sides of the slot when the actuator applies a pushing force to the at least one stator vane in the slot.

In another aspect, a method of removing at least one stator vane from a slot defined in an inner surface of a casing of a rotary machine is provided. The method includes coupling a reaction platform between opposing sides of the slot. The reaction platform includes at least one wedge surface. The method also includes coupling an actuator to the reaction platform, and applying a pushing force to the at least one stator vane using the actuator. The at least one wedge surface induces a coupling force exerted by the reaction platform to the opposing sides of the slot when the actuator applies the pushing force.

DETAILED DESCRIPTION

The exemplary systems and methods described herein overcome at least some of the disadvantages associated with a removal of stator vanes from slots in the casings of rotary machines. The embodiments described herein include a reaction platform configured to couple to a slot. More specifically, the reaction platform is reversibly expandable from an insertion configuration to a secured configuration. In the insertion configuration, the reaction platform is insertable into the slot in a clearance fit. In the secured configuration, the reaction platform exerts a securing force against opposing sides of the slot. An actuator, such as but not limited to a hydraulic jack, is coupleable to the reaction platform. When the reaction platform is in the secured position, the actuator is operable to apply a force sufficient to move at least one stator vane in the slot.

Figure 1:
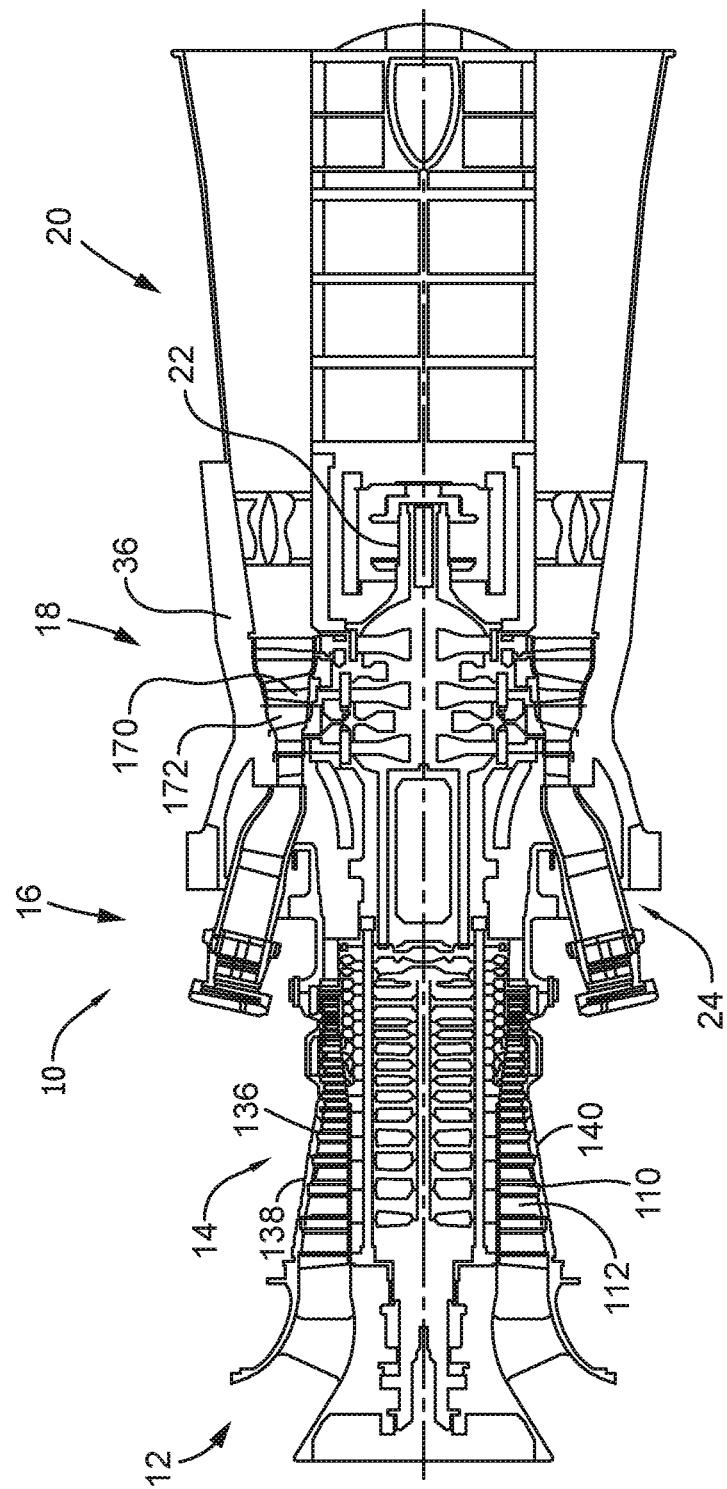
FIG. 1 is a schematic view of an exemplary rotary machine.

FIG. 1 is a schematic view of an exemplary rotary machine 10 with which embodiments of the reaction platform of the current disclosure may be used. In the exemplary embodiment, rotary machine 10 is a gas turbine that includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A generally tubular casing 36 at least partially encloses one or more of intake section 12, compressor section 14, combustor section 16, turbine section 18, and exhaust section 20. In the exemplary embodiment, casing 36 includes a plurality of casings that at least partially enclose different sections of gas turbine 10, including a casing 136 that encloses compressor section 14. In alternative embodiments, rotary machine 10 is any suitable rotary machine, and casing 136 is any suitable portion of casing 36 of rotary machine 10, that enables the reaction platform of the current disclosure to function as described herein.

In the exemplary embodiment, turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature. More specifically, rotor shaft 22 imparts rotational energy to at least one circumferential row of compressor blades 110 coupled to rotor shaft 22 within compressor section 14. In the exemplary embodiment, each row of compressor blades 110 is preceded by a circumferential row of compressor stator vanes 112 extending radially inward from casing 36 that direct the air flow into compressor blades 110. The rotational energy of compressor blades 110 increases a pressure and temperature of the air. Compressor section 14 discharges the compressed air towards combustor section 16.

In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy. More specifically, the combustion gases impart rotational energy to at least one circumferential row of rotor blades 170 coupled to rotor shaft 22 within turbine section 18. In the exemplary embodiment, each row of rotor blades 170 is preceded by a circumferential row of turbine stator vanes 172 extending radially inward from casing 36 that direct the combustion gases into rotor blades 170. Rotor shaft 22 may be coupled to a load (not shown) such as, but not limited to, an electrical generator and/or a mechanical drive application. The exhausted combustion gases flow downstream from turbine section 18 into exhaust section 20.

Figure 2:
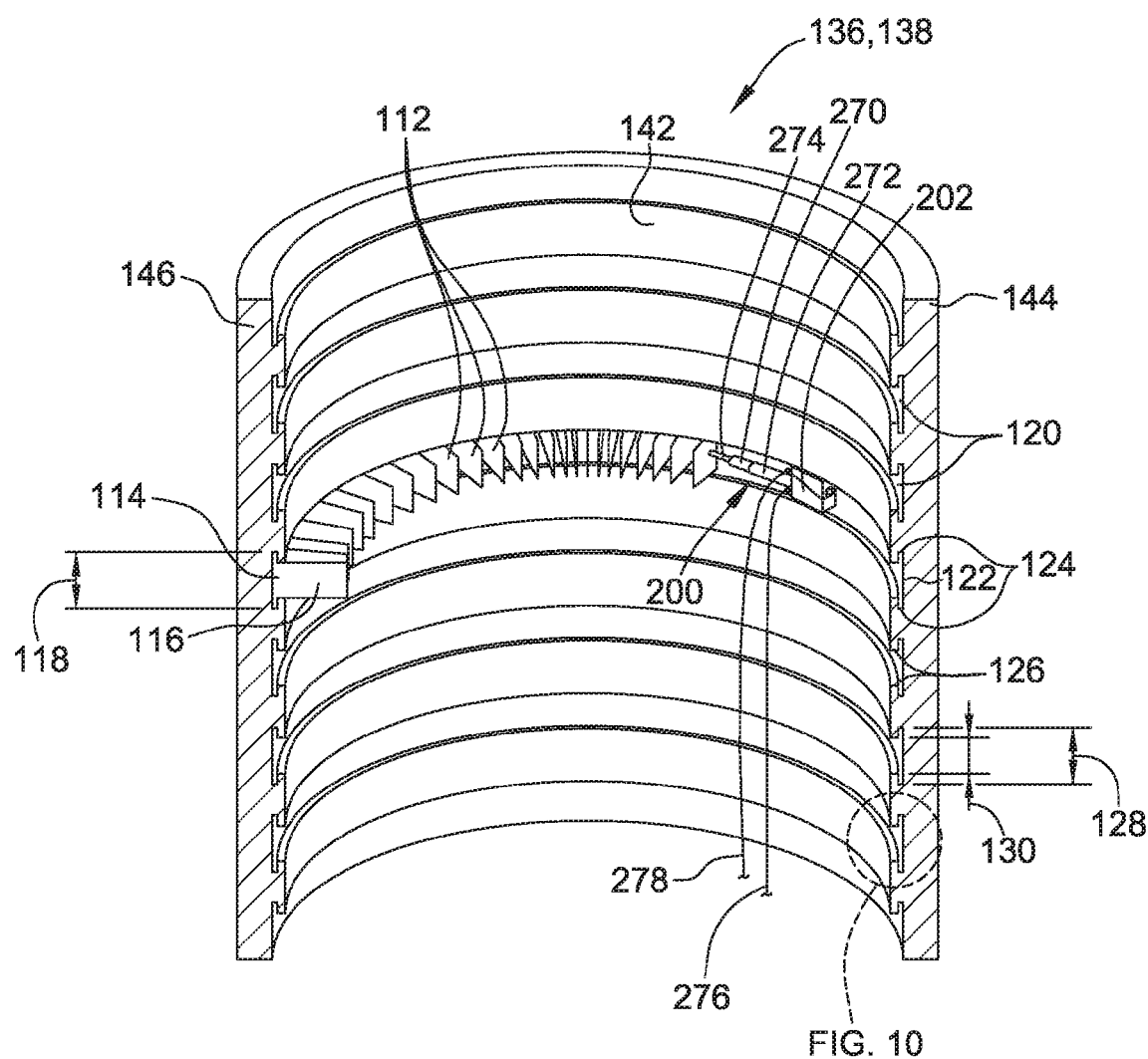
FIG. 2 is a schematic perspective view of an exemplary stator vane removal system coupled to a portion of an exemplary casing that may be used with the exemplary rotary machine of FIG. 1.

FIG. 2 is a schematic perspective view of an exemplary stator vane removal system 200 coupled to a portion of an exemplary embodiment of casing 136 of rotary machine 10. With reference to FIG. 1, casing 136 is divided into an upper section 138 and a lower section 140, and FIG. 2 more specifically illustrates upper section 138 uncoupled from lower section 140, and rotated 90 degrees from its operational position into an upright position for maintenance. Although embodiments of the present disclosure will be described in connection with upper section 138 in the upright position, it should be understood that embodiments of the present disclosure apply to each of lower section 140 and upper section 138 in any of the operational position, another horizontal position, or any other suitably supported position. It also should be understood that, although embodiments of the present disclosure will be described with reference to casing 136 of compressor section 14 of gas turbine 10, in alternative embodiments, casing 136 may be any suitable portion of a casing of a rotary machine that enables embodiments of the present disclosure to function as described herein.

A radially inner surface 142 of casing 136 includes at least one slot 120 configured to retain a row of stator vanes 112. Each slot 120 extends circumferentially about upper section 138 between an axially extending first edge 144 and an axially extending second edge 146 of upper section 138. In alternative embodiments, at least one of slots 120 extends to only one of first edge 144 and second edge 146. In FIG. 2, for clarity, only one slot 120 is illustrated as still containing stator vanes 112, with some of the stator vanes 112 already having been removed from that slot 120 as well, but it should be understood that when casing 136 is in an assembled condition, each slot 120 is packed with adjacent stator vanes from first edge 144 to second edge 146.

Figure 10:
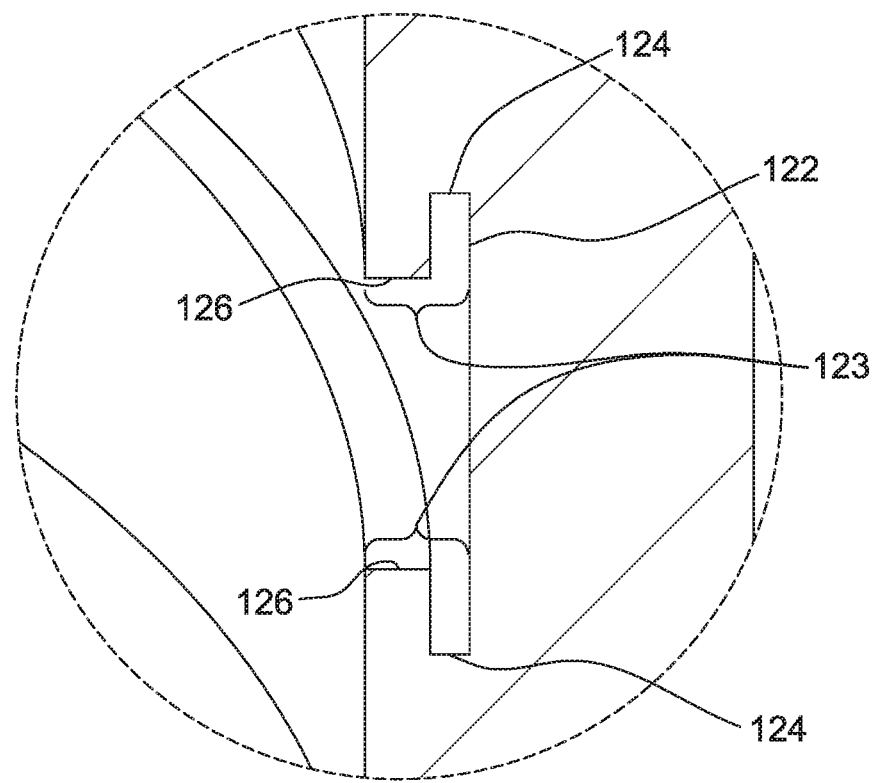
FIG. 10 is a schematic perspective view of a detail of the exemplary casing of FIG. 2.

FIG. 10 is a schematic perspective view of a detail of upper section 138 of casing 136 shown in FIG. 2. With reference to FIGS. 2 and 10, in the exemplary embodiment, each at least one slot 120 is defined by a radially outer base 122 and a pair of opposing sides 123 that each extend generally radially inwardly from base 122. In the exemplary embodiment, each side 123 includes a radially outer portion designated side wall 124, and a radially inner portion designated lip 126. More specifically, a pair of opposing lips 126 extend toward each other partially across slot 120, such that a width 130 of slot 120 between lips 126 is less than a width 128 of slot 120 between side walls 124. In alternative embodiments, each slot 120 has any suitable configuration that enables reaction platform 202 to function as described herein. Moreover, although each slot 120 is illustrated in FIG. 2 as having a similar size, in alternative embodiments a size of at least one slot 120 differs from a size of another of slots 120.

In the exemplary embodiment, each stator vane 112 includes a root 114 and an airfoil 116. Root 114 is configured to couple to a corresponding slot 120, while airfoil 116 is configured to extend into a gas flow path of rotary machine 10. In the exemplary embodiment, root 114 is shaped to be received by slot 120 such that slot 120 restricts radial movement of stator vane 112. For example, a width 118 of root 114 is at least slightly less than width 128 of slot 120 between side walls 124, such that root 114 is slidably insertable into slot 120 at either of first edge 144 and second edge 146, and width 118 is greater than width 130 between lips 126, such that root 114 is radially constrained between base 122 and lips 126 after stator vane 112 is inserted into slot 120. Although embodiments of the present disclosure are described in relation to stator vanes 112 having a single airfoil 116 coupled to a single root 114, the present disclosure also is applicable to stator vanes 112 that include a plurality of airfoils 116 coupled to each root 114.

In the exemplary embodiment, each stator vane 112 is configured to be slidably movable circumferentially along slot 120 into a desired position. In certain embodiments, each slot 120 of upper section 138 is packed with circumferentially adjacent stator vanes 112, and each slot 120 aligns with a corresponding slot (not shown) of lower section 140 that is packed with circumferentially adjacent stator vanes 112, such that circumferential movement of stator vanes 112 is constrained when upper section 138 and lower section 140 are coupled together. It should be understood that additional restraining features (not shown) may be used to constrain circumferential movement of stator vanes 112 when upper section 138 and lower section 140 are coupled together.

To remove stator vanes 112 from slot 120 for maintenance or replacement, each of stator vanes 112 in sequence can be slid circumferentially along slot 120 to one of first edge 144 and second edge 146 and removed, starting with the stator vane 112 proximate the one of first edge 144 and second edge 146. As discussed above, however, to slide at least some stator vanes 112 along slot 120, a significant force may be required. In the exemplary embodiment, stator vane removal system 200 is used to apply such a force to stator vanes 112. Stator vane removal system 200 includes a reaction platform 202 that is configured to releasably couple to slot 120, and an actuator 270 that is configured to couple to reaction platform 202. Actuator 270 is configured to apply a pushing force to a proximate stator vane 112 in a direction approximately tangential to slot 120.

More specifically, reaction platform 202 is configured to securely releasably couple to slot 120 at any location along slot 120 such that reaction platform 202 is capable of reacting a force applied by actuator 270 to the proximate stator vane 112. Actuator 270 is configured to couple to reaction platform 202 in any suitable fashion that enables stator vane removal system 200 to function as described herein. For example, but not by way of limitation, in the embodiment illustrated in FIG. 4, actuator 270 includes a clevis 280 that is rotatably coupleable to a tang 346 on reaction platform 202 using a pin 282.

Returning to FIG. 2, in the exemplary embodiment, actuator 270 is a hydraulic ram that includes a rod 274 extendably coupled to a cylinder 272. Rod 274 is configured to extend to the proximate stator vane 112 and to apply a force to the proximate stator vane 112 in a direction approximately tangential to slot 120. It should be understood that the closer reaction platform 202 is positioned to the proximate stator vane 112, the better the direction of the force applied by actuator 270 approximates the tangential direction, which is generally the most effective pushing direction. In certain embodiments, after the stator vanes 112 have been moved a certain distance along slot 120, reaction platform 202 can be uncoupled from slot 120, repositioned closer to the proximate stator vane 112, and re-coupled to slot 120 to improve the effectiveness of actuator 270.

In certain embodiments, rod 274 is coupled directly against the proximate stator vane 112. In alternative embodiments, rod 274 does not contact the proximate stator vane 112 directly. For example, but not by way of limitation, at least one of a shim and a protective material is coupled between rod 274 and the proximate stator vane 112. In the exemplary embodiment, a hydraulic supply line 276 and a hydraulic return line 278 are coupled to cylinder 272. A suitable valve system (not shown) coupled to hydraulic supply line 276 and hydraulic return line 278 controls a hydraulic pressure within cylinder 272, and thus controls a force applied by rod 274 to the proximate stator vane 112. In alternative embodiments, actuator 270 is any suitable actuator that enables stator vane removal system 200 to function as described herein.

Figure 3:
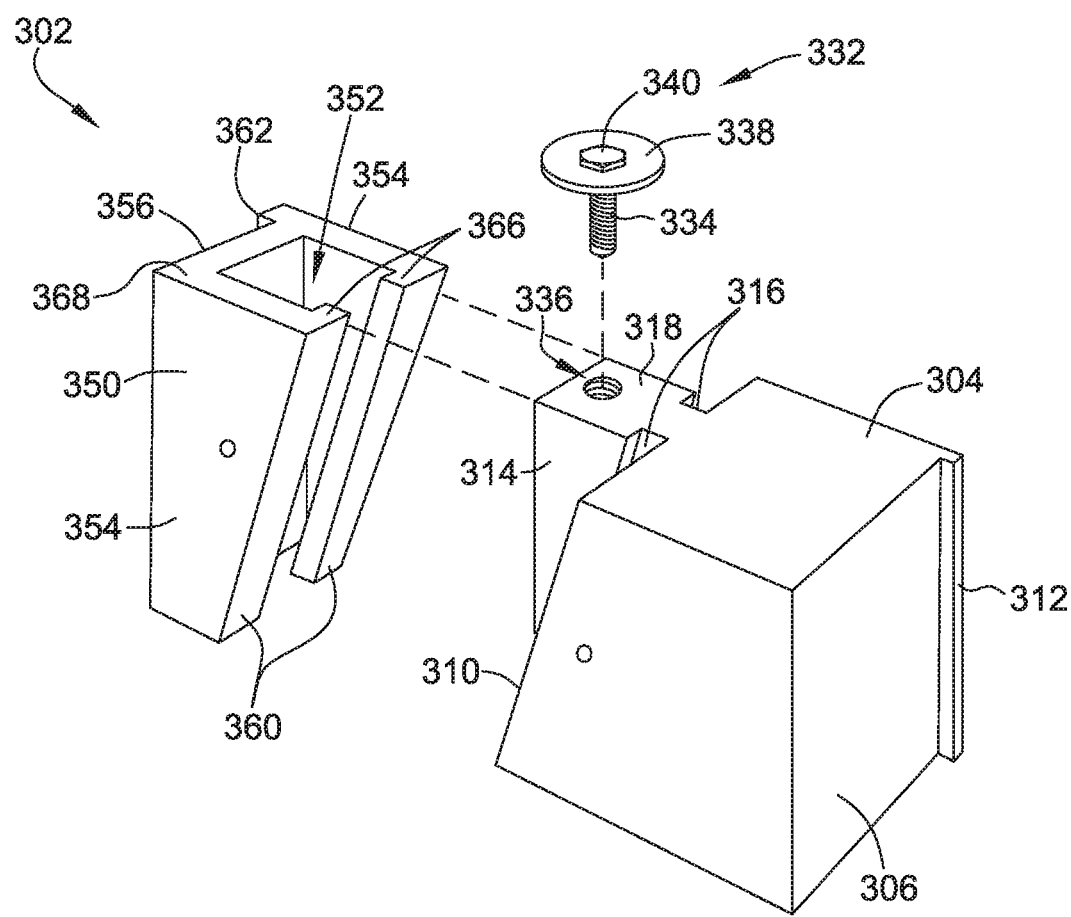
FIG. 3 is a schematic exploded perspective view of a first exemplary embodiment of a reaction platform that may be used with the exemplary stator vane removal system of FIG. 2.
Figure 4:
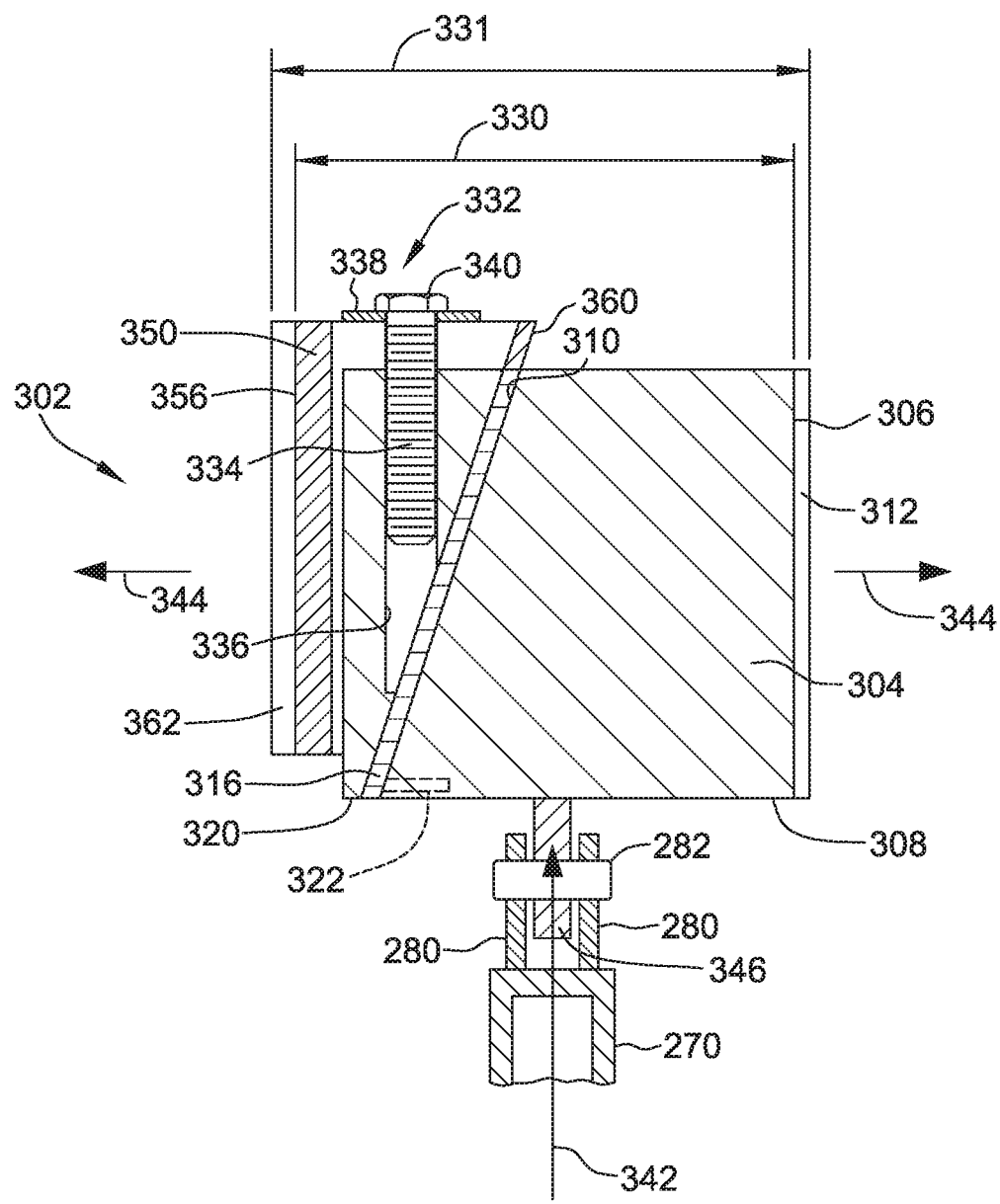
FIG. 4 is a schematic section view of the reaction platform of FIG. 3.

FIG. 3 is a schematic exploded perspective view of a first exemplary embodiment of reaction platform 202, designated reaction platform 302, that may be used with stator vane removal system 200. FIG. 4 is a schematic section view of reaction platform 302. With reference to FIGS. 2-4, reaction platform 302 is configured to reversibly transition between an insertion configuration and a secured configuration. In the insertion configuration, reaction platform 302 is insertable into slot 120 in a clearance fit between opposing pair of lips 126 of slot 120. In the secured configuration, reaction platform 302 is configured to couple between opposing sides 123 of slot 120. More specifically, reaction platform 302 is configured to couple between at least one of pair of opposing lips 126 and pair of opposing side walls 124 of slot 120 with a coupling force sufficient to react a pushing force applied by actuator 270 to the proximate stator vane 112.

In the exemplary embodiment, reaction platform 302 includes a block 304 and a sleeve 350. Block 304 includes a first bearing surface 306 configured to couple to a first of the pair of opposing lips 126 of slot 120, and sleeve 350 includes a second bearing surface 356 configured to couple to a second of the pair of opposing lips 126. In the exemplary embodiment, first bearing surface 306 and second bearing surface 356 are generally parallel. In alternative embodiments, first bearing surface 306 and second bearing surface 356 are other than generally parallel.

Block 304 further includes a reaction surface 308 configured to couple to actuator 270. In the exemplary embodiment, reaction surface 308 is generally perpendicular to first bearing surface 306. In alternative embodiments, reaction surface 308 is other than generally perpendicular to first bearing surface 306. In the exemplary embodiment, as discussed above, reaction surface 308 includes a tang 346 configured to couple to actuator 270. In an alternative embodiment, reaction surface 308 is configured to bear directly against a corresponding surface of actuator 270. In other alternative embodiments, reaction platform 302 is configured to couple to actuator 270 in any suitable fashion that enables stator vane removal system 200 to function as described herein.

Block 304 also includes a wedge surface 310 that is inclined from a plane parallel to first bearing surface 306. Block wedge surface 310 faces obliquely toward sleeve 350 and faces obliquely away from reaction surface 308. Sleeve 350 includes a wedge surface 360 that is inclined from a plane parallel to second bearing surface 356. Sleeve wedge surface 360 faces obliquely toward block 304 and faces obliquely towards reaction surface 308. More specifically, sleeve wedge surface 360 is inclined oppositely from, and complementarily to, block wedge surface 310.

Sleeve wedge surface 360 is configured to slidably couple to block wedge surface 310. More specifically, sleeve wedge surface 360 is configured to slide relative to block wedge surface 310 in a direction parallel to block wedge surface 310. For example, in the exemplary embodiment, sleeve wedge surface 360 is a pair of sleeve wedge surfaces 360. Sleeve 350 also includes a pair of opposing side walls 354 that each extend between second bearing surface 356 and a respective one of the pair of sleeve wedge surfaces 360. A cavity 352 is defined between side walls 354. Moreover, block 304 includes a post 314 that extends from block wedge surface 310. Post 314 is configured to be received at least partially within cavity 352 such that sleeve wedge surface 360 is slidably coupled to block wedge surface 310. In the exemplary embodiment, post 314 is integrally formed with block 304. In alternative embodiments, post 314 is formed separately and coupled to block 304 in any suitable fashion that enables stator vane removal system 200 to function as described herein. In other alternative embodiments, sleeve 350 and block 304 have any suitable configuration that enables sleeve wedge surface 360 to slidably couple to block wedge surface 310 such that stator vane removal system 200 can function as described herein.

Further in the exemplary embodiment, a pair of opposing guide channels 316 are defined between post 314 and block wedge surface 310. Each guide channel 316 extends parallel to block wedge surface 310 from a first end 318 of post 314 to a second end 320 of post 314. In addition, each of the pair of sleeve wedge surfaces 360 includes a projection 366 configured to be received in a respective one of guide channels 316 when sleeve 350 is slidably coupled to block 304. Projections 366 and guide channels 316 cooperate to maintain an alignment of block wedge surface 310 and sleeve wedge surface 360. To initially couple sleeve 350 and block 304, sleeve 350 is positioned below post second end 320, projections 366 are aligned with guide channels 316, and sleeve wedge surface 360 is moved parallel to block wedge surface 310 such that post 314 is received in cavity 352. In alternative embodiments, alignment of block wedge surface 310 and sleeve wedge surface 360 is maintained in any suitable fashion that enables stator vane removal system 200 to function as described herein.

Also in the exemplary embodiment, a retaining pin 322 is positioned within block wedge surface 310 proximate reaction surface 308 to prevent sleeve 350 and block 304 from uncoupling, such as but not limited to when reaction platform 302 is not in use. Retaining pin 322 is movable to a position flush with block wedge surface 310 to enable slidable coupling or uncoupling of sleeve 350 and block 304. Retaining pin 322 is biased such that, after sleeve wedge surface 360 is slid upward along block wedge surface 310 past retaining pin 322, retaining pin 322 projects from block wedge surface 310 to prevent return downward movement of sleeve 350 past retaining pin 322. In alternative embodiments, any suitable structure is used to prevent sleeve 350 and block 304 from uncoupling.

Figure 9:
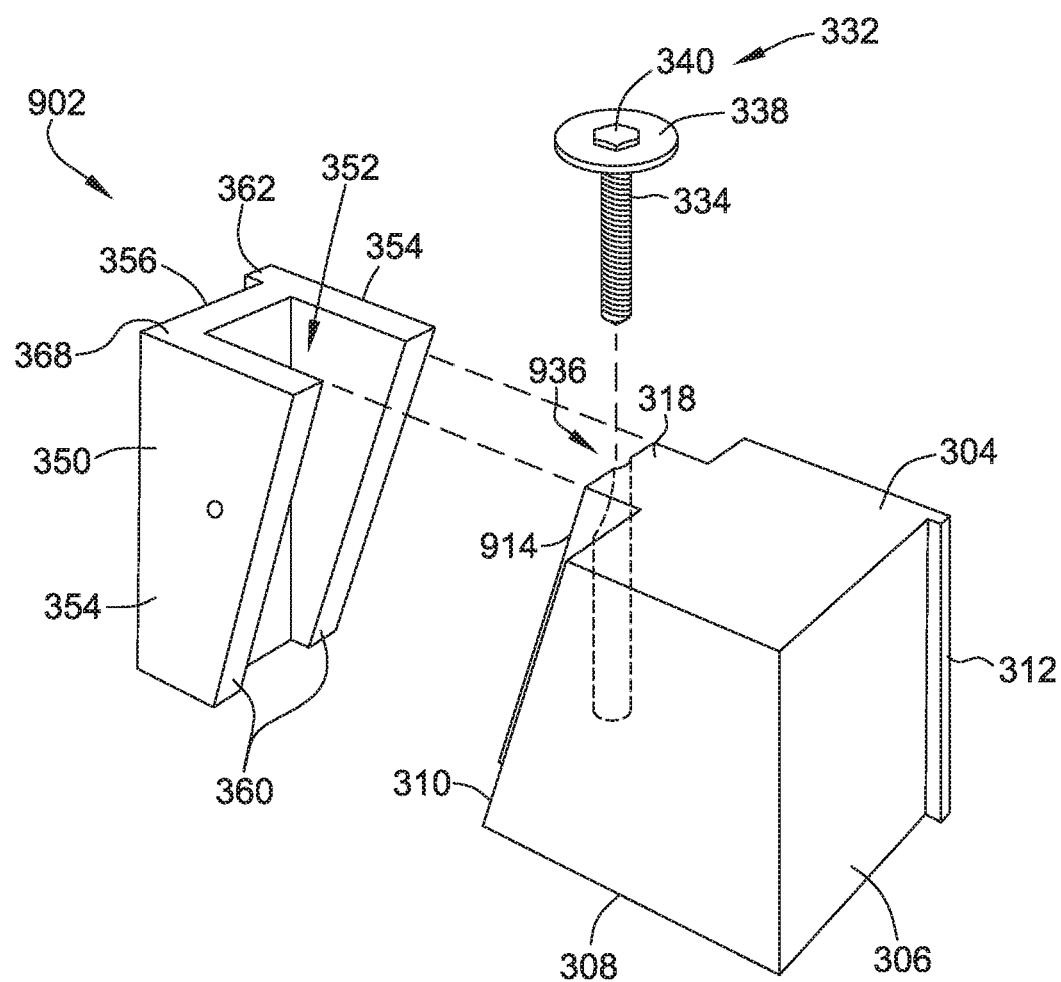
FIG. 9 is a schematic exploded perspective view of a fourth exemplary embodiment of a reaction platform that may be used with the exemplary stator vane removal system of FIG. 2.

In other alternative embodiments, sleeve 350 and block 304 are not prevented from uncoupling when reaction platform 302 is not in use. For example, FIG. 9 is a schematic exploded perspective view of a fourth exemplary embodiment of reaction platform 202, designated reaction platform 902, that may be used with stator vane removal system 200. Reaction platform 902 is substantially identical to reaction platform 302 (shown in FIGS. 3 and 4) in most respects, and identical portions are labeled identically. However, reaction platform 902 does not include projections 366 on either of the pair of sleeve wedge surfaces 360, does not include guide channels 316 on block 304, and does not include retaining pin 322 within block wedge surface 310. In addition, a post 914 of reaction platform 902 differs from post 314 of reaction platform 302 in that a side surface 915 of post 914 is formed to be generally parallel to block wedge surface 310, rather than generally parallel to first bearing surface 306. As a result, unlike threaded aperture 336 defined in post 314, a threaded aperture 936 (shown in hidden lines) defined in post 914 is not fully defined at first end 318 of post 914, but rather threaded aperture 936 becomes fully defined as it extends down from first end 318 towards reaction surface 308. Although sleeve 350 and block 304 of reaction platform 902 are not prevented from uncoupling when reaction platform 302 is not in use, reaction platform 902 functions substantially identically in use to reaction platform 302.

Returning to reaction platform 302 and FIGS. 2-4, in the exemplary embodiment, block 304 includes a first retaining edge 312 that extends from first bearing surface 306 generally perpendicular to first bearing surface 306, and sleeve 350 includes a second retaining edge 362 that extends from second bearing surface 356 generally perpendicular to second bearing surface 356. In the exemplary embodiment, when reaction platform 302 is coupled to slot 120, each of first retaining edge 312 and second retaining edge 362 is disposed between base 122 and a respective one of opposing lips 126 of slot 120. First retaining edge 312 and second retaining edge 362 facilitate retaining reaction platform 302 within slot 120 while reaction platform is in transition between the insertion configuration and the secured configuration.

An inner width 330 of reaction platform 302 is defined between first bearing surface 306 and second bearing surface 356, and an outer width 331 of reaction platform 302 is defined between first retaining edge 312 and second retaining edge 362. As can best be seen in FIG. 4, as sleeve wedge surface 360 is slidably moved along block wedge surface 310, each of inner width 330 and outer width 331 correspondingly varies. More specifically, as sleeve 350 is slid parallel to block wedge surface 310 in a direction generally away from reaction surface 308, each of inner width 330 and outer width 331 decreases, and as sleeve 350 is slid parallel to block wedge surface 310 in a direction generally towards reaction surface 308, each of inner width 330 and outer width 331 increases.

In the exemplary embodiment, as reaction platform 302 is transitioned into the secured configuration while positioned within slot 120, first bearing surface 306 and second bearing surface 356 couple against opposing lips 126 of slot 120 such that reaction platform 302 becomes securely coupled within slot 120. Thus, in the exemplary embodiment, the insertion configuration occurs when outer width 331 is less than width 130 between opposing lips 126 of slot 120, and the secured configuration occurs when inner width 330 is substantially equal to width 130 between opposing lips 126 of slot 120. It should be understood that in alternative embodiments in which reaction platform 302 does not include first retaining edge 312 and second retaining edge 362, reaction platform outer width 331 is identical to reaction platform inner width 330.

In other alternative embodiments, first retaining edge 312 and second retaining edge 362 are configured such that a difference between outer width 331 and inner width 330 is greater than a difference between width 128 of slot 120, between side walls 124, and width 130 of slot 120, between lips 126. In such alternative embodiments, when reaction platform 302 is transitioned to the secured configuration, reaction platform 302 couples between pair of opposing side walls 124 of slot 120, rather than between pair of opposing lips 126. More specifically, each of first retaining edge 312 and second retaining edge 362 couples against a respective one of pair of opposing side walls 124. Thus, in such embodiments, the insertion configuration still occurs when outer width 331 is less than width 130 between opposing lips 126 of slot 120, but the secured configuration occurs when outer width 331 is substantially equal to width 128 between opposing side walls 124 of slot 120. In still other alternative embodiments, first retaining edge 312 and second retaining edge 362 are configured such that a difference between outer width 331 and inner width 330 is substantially equal to a difference between width 128 of slot 120 and width 130 of slot 120. In such other alternative embodiments, when reaction platform 302 is transitioned to the secured configuration, reaction platform 302 couples between both pair of opposing side walls 124 and pair of opposing lips 126.

In the exemplary embodiment, reaction platform 302 includes a transition mechanism 332 that is operable to facilitate transitioning reaction platform 302 from the insertion configuration to the secured configuration. Additionally or alternatively, sleeve 350 is positioned relative to block 304 by hand to facilitate transitioning reaction platform 302 from the insertion configuration to the secured configuration. Additionally or alternatively, a reaction force from actuator 270 facilitates transitioning reaction platform 302 from the insertion configuration to the secured configuration.

In the exemplary embodiment, transition mechanism 332 includes a bolt 334 insertable within a threaded aperture 336 defined in post 314. In certain embodiments, a lower portion of aperture 336 is also at least partially defined in block 304. In the exemplary embodiment, aperture 336 is defined generally parallel to first bearing surface 306. In alternative embodiments, aperture 336 is defined other than generally parallel to first bearing surface 306. In the exemplary embodiment, transition mechanism 332 also includes a washer 338. As bolt 334 is threaded sufficiently into aperture 336, a head 340 of bolt 334 urges washer 338 against a first surface 368 of sleeve 350, causing sleeve wedge surface 360 to slide along block wedge surface 310 in a direction generally towards reaction surface 308. As a result, reaction platform inner width 330 increases as bolt 334 is threaded further into aperture 336, until first bearing surface 306 and second bearing surface 356 couple against opposing lips 126 of slot 120 in the secured configuration. In alternative embodiments, transition mechanism 332 does not include washer 338, and bolt head 340 is sized to directly couple against first surface 368 of sleeve 350.

Figure 5:
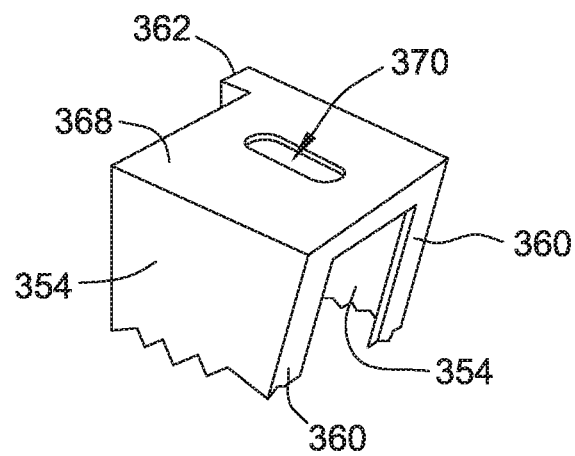
FIG. 5 is a schematic exploded perspective view of an exemplary embodiment of a portion of a sleeve that may be used with the exemplary reaction platform of FIG. 3.

In certain embodiments, first surface 368 extends at least partially above cavity 352 to increase a contact area between first surface 368 and at least one of washer 338 and bolt head 340. For example, FIG. 5 is a schematic exploded perspective view of an exemplary embodiment of a portion of sleeve 350 that may be used with reaction platform 302. In the embodiment shown in FIG. 5, first surface 368 extends between opposing side walls 354 of sleeve 350, and a slotted opening 370 is defined in first surface 368. Slotted opening 370 accommodates bolt 334 extending therethrough as sleeve wedge surface 360 slides along block wedge surface 310.

Referring again to FIGS. 2-4, in the exemplary embodiment, to transition from the secured configuration back to the insertion configuration, for example to remove reaction platform 302 from slot 120, bolt 334 is unthreaded from aperture 336 such that first bearing surface 306 and second bearing surface 356 uncouple from opposing lips 126, and sleeve 350 is slidable along block wedge surface 310 in a direction generally away from reaction surface 308 until reaction platform outer width 331 decreases to less than width 130 between opposing lips 126.

Block wedge surface 310 and sleeve wedge surface 360 of reaction platform 302 facilitate inducing a coupling force 344 exerted by reaction platform 302 to opposing sides 123 of slot 120 when actuator 270 applies a pushing force to the proximate stator vane 112. More specifically, as best shown in FIG. 4, a reaction force 342 exerted by actuator 270 on reaction surface 308, for example through tang 346, tends to push block 304 in a direction away from actuator 270. Thus, oblique block wedge surface 310 tends to slide along sleeve wedge surface 360 in a direction generally away from actuator 270, which tends to increase each of reaction platform inner width 330 and outer width 331. As inner width 330 and outer width 331 increase, coupling force 344 exerted generally normal to slot sides 123 by at least one pair of first and second bearing surfaces 306 and 356 and first and second retaining edges 312 and 362 also tends to increase. As normal coupling force 344 increases, a friction force exerted by slot sides 123 against reaction platform 302, opposite in direction to reaction force 342, is correspondingly induced, such that reaction platform 302 is increasingly securely coupled between sides 123.

Figure 6:
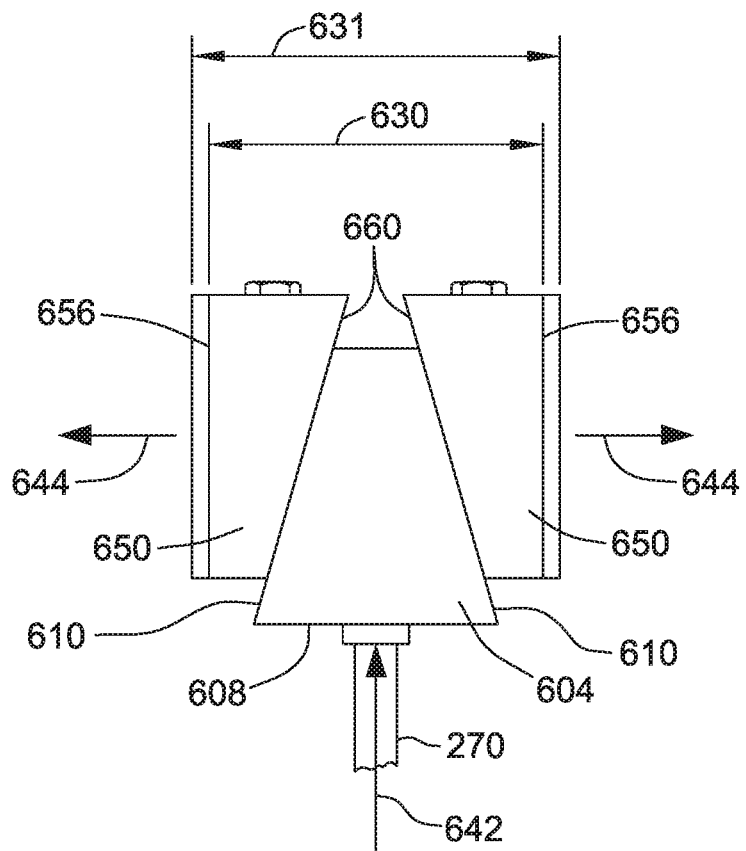
FIG. 6 is a schematic side view of a second exemplary embodiment of a reaction platform that may be used with the exemplary stator vane removal system of FIG. 2.

FIG. 6 is a schematic side view of a second exemplary embodiment of reaction platform 202, designated reaction platform 602, that may be used with stator vane removal system 200. Reaction platform 602 includes a block 604 with a pair of oblique block wedge surfaces 610 disposed on opposite sides of block 604. One of a pair of sleeves 650, each including a sleeve wedge surface 660, is slidably coupled to each of the opposite sides of block 604. For example, each of the pair of sleeves 650 is configured and coupled to block 604 in a similar fashion as that in which sleeve 350 is configured and coupled to block 304, as described above. Each of the pair of sleeves 650 includes a bearing surface 656 configured to couple against a corresponding one of opposing sides 123 of slot 120.

Like reaction platform 302, reaction platform 602 is configured such that block wedge surfaces 610 and sleeve wedge surfaces 660 facilitate inducing a coupling force 644 exerted by reaction platform 602 to opposing sides 123 of slot 120 when actuator 270 applies a pushing force to the proximate stator vane 112. More specifically, a reaction force 642 exerted on reaction surface 608 tends to push block 604 in a direction away from actuator 270. Thus, each oblique block wedge surface 610 tends to slide along the corresponding sleeve wedge surface 660 in a direction generally away from actuator 270, which tends to increase a reaction platform inner width 630 and outer width 631. As inner width 630 and outer width 631 increase, coupling force 644 exerted by, for example, bearing surfaces 656 of each of sleeves 650 generally normal to slot sides 123 also tends to increase, coupling reaction platform 602 increasingly securely between sides 123 in the fashion described above. In certain embodiments, the double-sleeve configuration of reaction platform 602 provides an increased tendency for each of bearing surfaces 656 to remain parallel to opposing slot sides 123, as compared to first bearing surface 306 and second bearing surface 356 of reaction platform 302.

Figure 7:
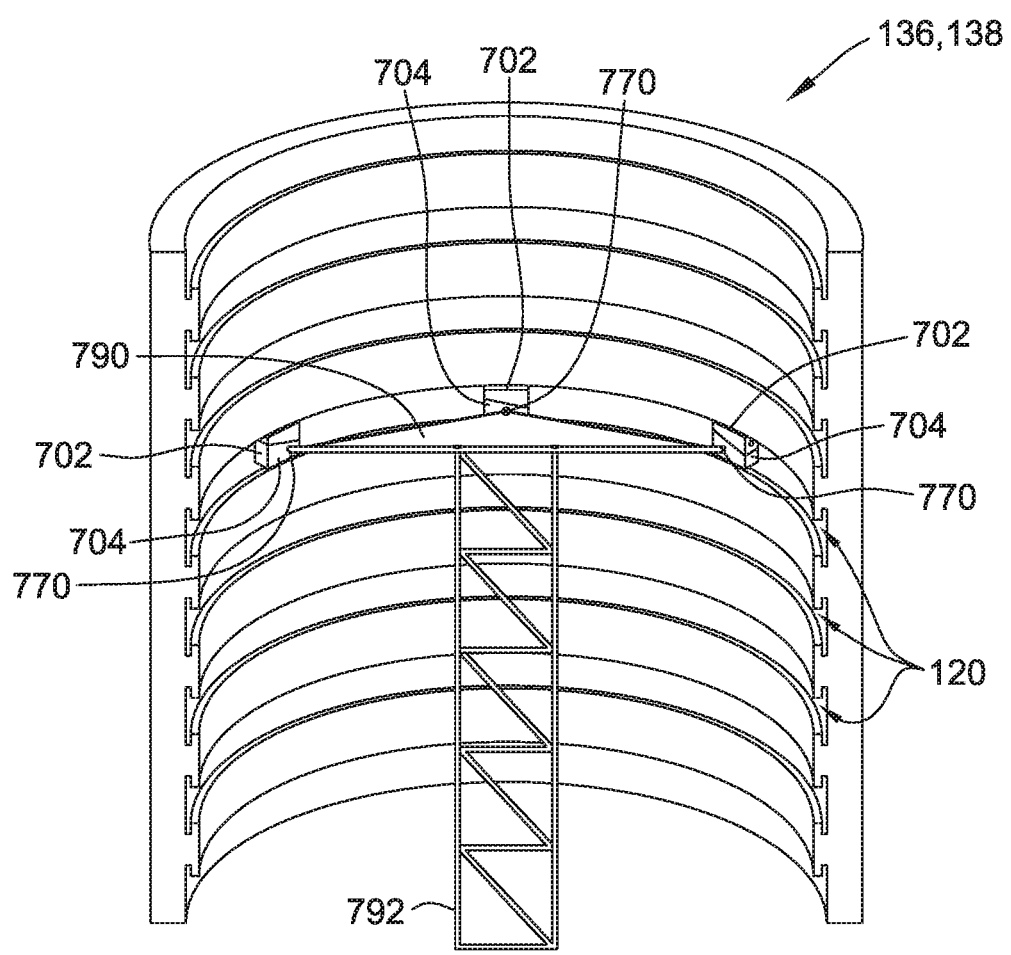
FIG. 7 is a schematic perspective view of a third exemplary embodiment of a reaction platform coupled to the portion of the exemplary casing of FIG. 2.

Reaction platform 202 is not limited to use with stator vane removal system 200. As one example, FIG. 7 is a schematic perspective view of a third embodiment of reaction platform 202, designated reaction platform 702, coupled to upper section 138 of casing 136. More specifically, three reaction platforms 702 are coupled to one of slots 120 of upper section 138. In the exemplary embodiment, each reaction platform 702 is substantially identical to reaction platform 302 as discussed above, but for a block 704 of reaction platform 702 that additionally includes a connecting structure 770. Connecting structure 770 is configured to couple to a work platform 790, such that each reaction platform 702 in the secured configuration at least partially supports work platform 790.

In certain embodiments, connecting structure 770 includes at least one eye bolt coupled to at least one threaded aperture of block 704, and the at least one eye bolt is configured to couple to work platform 790. In alternative embodiments, connecting structure 770 is any suitable structure that enables reaction platform 702 to function as described herein.

In certain embodiments, work platform 790 is suitable to support personnel and equipment used for maintenance and repair of upper section 138. For example, work platform 790 enables personnel to access stator vanes 112 in slots 120 located beyond the reach of ground-level personnel. Reaction platform 702 facilitates reducing or eliminating a need for a scaffolding structure 792 to support work platform 790, and/or facilitates reducing or eliminating a need for a personnel lift (not shown) to enable maintenance and repair of upper section 138. Although three reaction platforms 702 are shown in the exemplary embodiment, in alternative embodiments any suitable number of reaction platforms 702 are used to support work platform 790.

Figure 8:
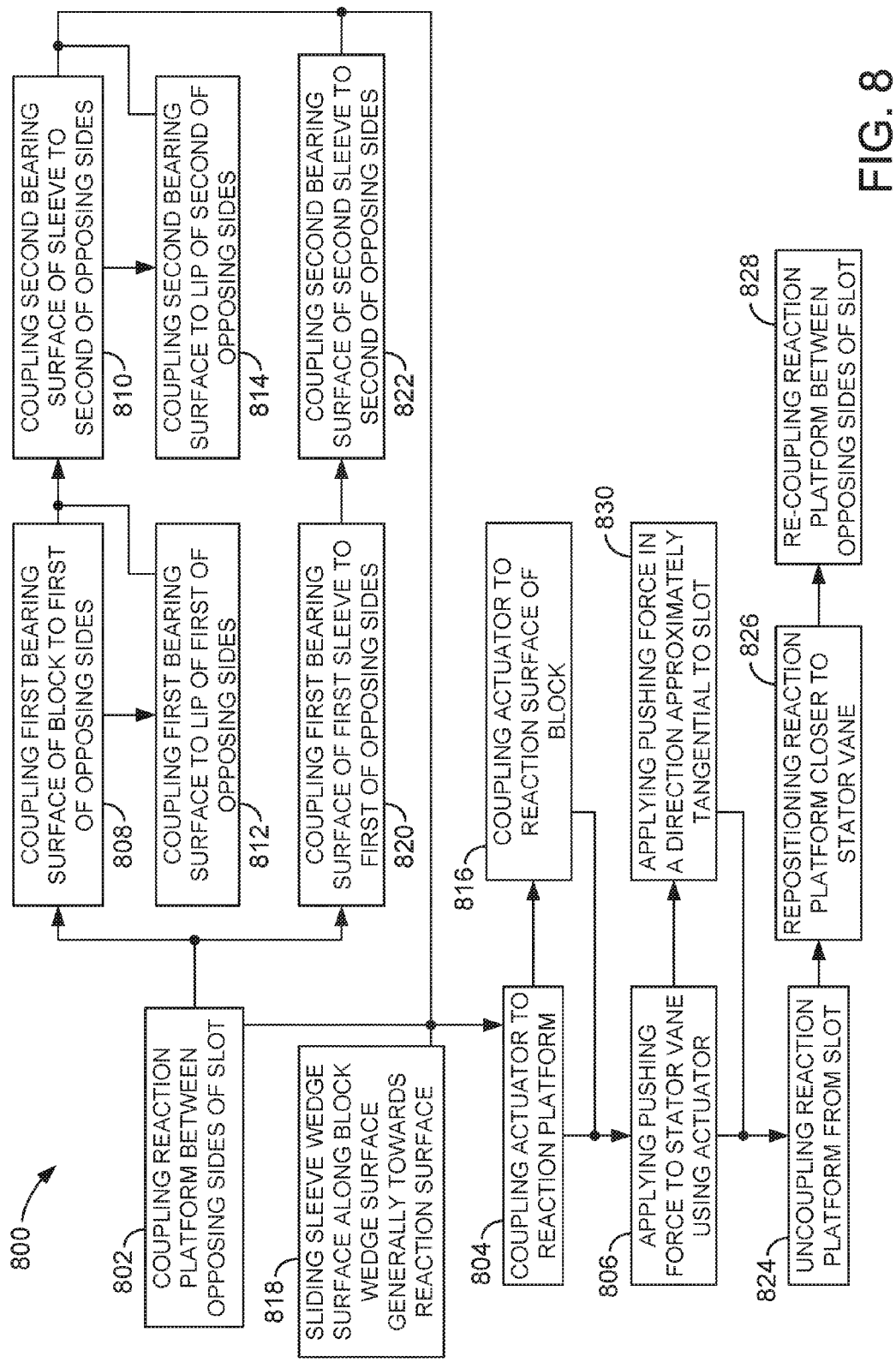
FIG. 8 is a flow diagram of an exemplary method of removing at least one stator vane from a slot defined in an inner surface of a casing of a rotary machine, such as the exemplary casing of FIG. 2.

An exemplary method 800 of removing at least one stator vane, such as stator vane 112, from a slot defined in an inner surface of a casing of a rotary machine, such as slot 120 of upper section 138 of casing 136 of rotary machine 10, is illustrated in FIG. 8. With reference also to FIGS. 1-6 and 9-10, method 800 includes coupling 802 a reaction platform, such as reaction platform 202, 302, 602, or 902, between opposing sides, such as sides 123, of the slot. The reaction platform includes at least one wedge surface, such as at least one of block wedge surface 310 or 610 and sleeve wedge surface 360 or 660. Method 800 also includes coupling 804 an actuator, such as actuator 270, to the reaction platform, and applying 806 a pushing force to the at least one stator vane using the actuator. The at least one wedge surface induces a coupling force, such as coupling force 344 or 644, exerted by the reaction platform to the opposing sides of the slot when the actuator applies the pushing force.

In certain embodiments, the reaction platform includes a block, such as block 304 or 604, and a sleeve, such as sleeve 350 or 650, slidably coupled to the block, and coupling 802 the reaction platform between the opposing sides of the slot includes coupling 808 a first bearing surface of the block, such as first bearing surface 306, to a first of the opposing sides of the slot, and coupling 810 a second bearing surface of the sleeve, such as second bearing surface 356, to a second of the opposing sides of the slot. Moreover, in some such embodiments, coupling 808 the first bearing surface includes coupling 812 the first bearing surface to a lip, such as lip 126, of the first of the opposing sides of the slot, and coupling 810 the second bearing surface includes coupling 814 the second bearing surface to a lip, such as lip 126, of the second of the opposing sides of the slot.

Additionally, in some embodiments, coupling 804 the actuator to the reaction platform includes coupling 816 the actuator to a reaction surface, such as reaction surface 308 or 608, of the block. In some such embodiments, the at least one wedge surface includes a block wedge surface, such as block wedge surface 310 or 610, of the block and a sleeve wedge surface, such as sleeve wedge surface 360 or 660, of the sleeve, and coupling 802 the reaction platform between the opposing sides of the slot includes sliding 818 the sleeve wedge surface along the block wedge surface in a direction generally towards the reaction surface.

In certain embodiments, the reaction platform includes a block, such as block 604, and a pair of sleeves, such as sleeves 650. Each sleeve is slidably coupled to one of a pair of opposing sides of the block, and coupling 802 the reaction platform between the opposing sides of the slot includes coupling 820 a first bearing surface, such as bearing surface 656, of a first of the pair of sleeves to a first of the opposing sides of the slot, and coupling 822 a second bearing surface, such as bearing surface 656, of a second of the pair of sleeves to a second of the opposing sides of the slot.

In some embodiments, method 800 also includes uncoupling 824 the reaction platform from the slot, repositioning 826 the reaction platform closer to the at least one stator vane, and re-coupling 828 the reaction platform between the opposing sides of the slot to improve an effectiveness of the actuator.

In certain embodiments, applying 806 the pushing force includes applying 830 the pushing force in a direction approximately tangential to the slot.

Exemplary embodiments of a system and method for removing stator vanes from a casing of a rotary machine are described above in detail. The embodiments include a reaction platform and an actuator configured to couple to the reaction platform. The embodiments provide an advantage over at least some known systems and methods for removing stator vanes. For example, the reaction platform is reversibly expandable from an insertion configuration to a secured configuration, enabling the reaction platform to be coupled at any location along a stator vane retaining slot to facilitate coupling of the actuator and the stator vanes. The embodiments also provide an advantage in that at least one wedge surface of the reaction block facilitates inducing a coupling force between the reaction platform and the opposing sides of the slot when the actuator applies a pushing force to the stator vane in the slot.

The methods and systems described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A stator vane removal system comprising:
a reaction platform configured to couple between opposing sides of a slot defined in an inner surface of a casing of a rotary machine, wherein at least one stator vane is retained in the slot, said reaction platform comprises a block and at least one sleeve configured to slidably couple to said block along at least one wedge surface; and
an actuator configured to couple to said reaction platform, said at least one wedge surface is configured to induce a coupling force exerted by said reaction platform to the opposing sides of the slot in response to a pushing force applied by said actuator to the at least one stator vane in the slot.

2. The system according to claim 1, wherein said block comprises a first bearing surface configured to couple to a first of the opposing sides of the slot, and said sleeve comprises a second bearing surface configured to couple to a second of the opposing sides of the slot.

3. The system according to claim 2, wherein said block further comprises a reaction surface configured to couple to said actuator, said reaction surface is generally perpendicular to said first bearing surface.

4. The system according to claim 3, wherein said at least one wedge surface includes a block wedge surface of said block and a sleeve wedge surface of said sleeve, said sleeve wedge surface is slidably coupled to said block wedge surface.

5. The system according to claim 4, wherein said block wedge surface faces obliquely toward said sleeve and faces obliquely away from said reaction surface.

6. The system according to claim 5, wherein said sleeve wedge surface is inclined oppositely from, and complementarily to, said block wedge surface.

7. The system according to claim 1, wherein said block further comprises a post, said post is received at least partially within a cavity defined by said sleeve.

8. The system according to claim 1, wherein said reaction platform comprises a block and a pair of sleeves, each said sleeve is slidably coupled to one of a pair of opposing sides of said block.

9. The system according to claim 8, wherein a first of said pair of sleeves comprises a first bearing surface configured to couple to a first of the opposing sides of the slot, and a second of said pair of sleeves comprises a second bearing surface configured to couple to a second of the opposing sides of the slot.

10. The system according to claim 9, wherein said at least one wedge surface includes a pair of block wedge surfaces disposed on opposite sides of said block and a sleeve wedge surface of each said sleeve, each said sleeve wedge surface is slidably coupled to one of said pair of block wedge surfaces.

11. The system according to claim 1, wherein said actuator is configured to apply the pushing force to the at least one stator vane in a direction approximately tangential to the slot.

12. A stator vane removal system comprising:
a reaction platform configured to couple between opposing sides of a slot defined in an inner surface of a casing of a rotary machine, wherein at least one stator vane is retained in the slot, said reaction platform comprises at least one wedge surface; and
an actuator configured to couple to said reaction platform, said at least one wedge surface oriented to react a pushing force applied to the at least one stator vane in the slot by said actuator such that a coupling force is exerted by said reaction platform to the opposing sides of the slot in a direction substantially perpendicular to the pushing force.

13. The system according to claim 12, wherein said reaction platform comprises a block and at least one sleeve slidably coupled to said block along said at least one wedge surface.

14. The system according to claim 13, wherein said block comprises a first bearing surface configured to couple to a first of the opposing sides of the slot, and said at least one sleeve comprises a second bearing surface configured to couple to a second of the opposing sides of the slot.

15. The system according to claim 14, wherein said at least one wedge surface includes a block wedge surface of said block and a sleeve wedge surface of said at least one sleeve, said sleeve wedge surface is slidably coupled to said block wedge surface.

16. A stator vane removal system comprising:
a reaction platform configured to couple between opposing sides of a slot defined in an inner surface of a casing of a rotary machine, wherein at least one stator vane is retained in the slot, said reaction platform comprises at least one wedge surface; and
an actuator configured to couple between said reaction platform and the at least one stator vane such that said actuator is disposed at least partially between the opposing sides of the slot, said at least one wedge surface is oriented to induce a coupling force exerted by said reaction platform to the opposing sides of the slot when said actuator applies a pushing force to the at least one stator vane in the slot.

17. The system according to claim 16, wherein said reaction platform comprises a block and at least one sleeve slidably coupled to said block along said at least one wedge surface.

18. The system according to claim 17, wherein said block comprises a first bearing surface configured to couple to a first of the opposing sides of the slot, and said at least one sleeve comprises a second bearing surface configured to couple to a second of the opposing sides of the slot.

19. The system according to claim 18, wherein said block further comprises a reaction surface configured to couple to said actuator, said reaction surface is generally perpendicular to said first bearing surface.

20. The system according to claim 16, wherein said block further comprises a post, said post is received at least partially within a cavity defined by said at least one sleeve.

* * * * *